(12) United States Patent
Haddad

(10) Patent No.: US 8,547,938 B2
(45) Date of Patent: Oct. 1, 2013

(54) DATA FLOW TRANSFER BETWEEN WIRELESS CONNECTIONS

(75) Inventor: Wassim Haddad, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 196 days.

(21) Appl. No.: 13/081,329

(22) Filed: Apr. 6, 2011

(65) Prior Publication Data

US 2012/0188979 A1  Jul. 26, 2012

Related U.S. Application Data

(60) Provisional application No. 61/435,711, filed on Jan. 24, 2011.

(51) Int. Cl.
*H04W 4/00* (2009.01)
*H04W 36/00* (2009.01)

(52) U.S. Cl.
USPC .......................................... 370/332; 455/444

(58) Field of Classification Search
USPC ................. 370/328–332, 341; 455/436–438, 455/440, 443, 444
See application file for complete search history.

(56) References Cited

U.S. PATENT DOCUMENTS

| 7,693,093 B2 * | 4/2010 | Riedel et al. | 370/260 |
| 2009/0073943 A1 * | 3/2009 | Krishnaswamy et al. | 370/338 |
| 2011/0252151 A1 * | 10/2011 | Lu et al. | 709/228 |
| 2012/0231792 A1 * | 9/2012 | Michel | 455/436 |

OTHER PUBLICATIONS

Ford et al, "TCP Extensions for Multipath Operation with Multiple Addresses," Oct. 26, 2009.*
Han H. et al., "Multi-Path TCP: A Joint Congestion Control and Routing Scheme to Exploit Path Diversity in the Internet", draft-ietf-mptcp-architecture-00, Feb. 2010, pp. 1-26.
Han, H. et al., "Multi-Path TCP: A Joint Congestion Control and Routing Scheme to Exploit Path Diversity in the Internet", IEEE/ACM Transactions on Networking, vol. 14 Issue 6, Dec. 2006.

* cited by examiner

*Primary Examiner* — Kerri Rose

(57) ABSTRACT

A method and apparatus taught herein provide for transfer of a data flow between two mobile nodes from a cellular connection supported by a cellular communication network to a non-cellular, ad-hoc connection between the mobile nodes. In one embodiment, a network node configured for operation in the cellular communication network detects that the two mobile nodes have moved within an ad-hoc communication range and transfers the data flow from the cellular connection to the ad-hoc connection responsive to the detection. The network node may include a control circuit to perform the detection, and a communication interface to send control signaling to effectuate the transfer. As a non-limiting example, the network node is a base station in the cellular communication network.

4 Claims, 6 Drawing Sheets

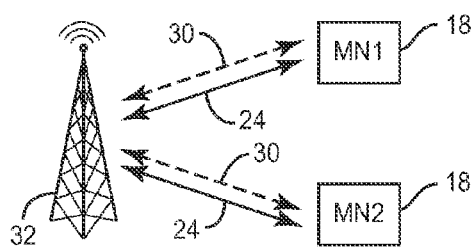
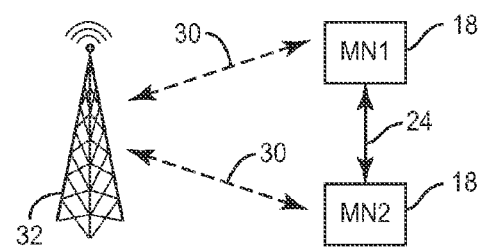
FIG. 4A
FIG. 4B

DATA FLOW TRANSFER BETWEEN WIRELESS CONNECTIONS

RELATED APPLICATION

This application claims the benefit of U.S. Provisional Patent Application 61/435,711 filed Jan. 24, 2011, which is incorporated herein by reference.

TECHNICAL FIELD

The present invention generally relates to wireless communication, and more particularly relates to transferring a data flow between different wireless connections.

BACKGROUND

As cellular phone usage becomes increasingly prevalent, cellular networks are supporting increasing amounts of voice and data transmissions between users. In some instances, mobile nodes (e.g. cellular phones) having a cellular connection may be in close proximity to each other while communicating with each other, but may be unaware of their proximity. In these instances, it may be more efficient from a network standpoint to have the mobile nodes communicate directly with each other instead of communicating via one or more remote cellular base stations.

Also, in some instances a mobile node may have information relevant to a particular location that is of interest to other mobile nodes that are located within a certain range of that location. However, because the mobile nodes are unaware of each other's locations, this relevant information may never reach those interested mobile nodes. Thus, data transmissions between mobile nodes have been limited to a "talking to" category in which devices are simply aware of their communication destination but not their surroundings, as opposed to a "talking about" category in which devices are able to share location-dependent information in a localized manner.

SUMMARY

A method of transferring a data flow between two mobile nodes from a cellular connection supported by a cellular communication network to a non-cellular, ad-hoc connection between the mobile nodes, according to one embodiment, is implemented by a network node configured for operation in the cellular communication network. The network node detects that the two mobile nodes have moved within an ad-hoc communication range and transfers the data flow from the cellular connection to the ad-hoc connection responsive to the detection. In one embodiment the network node includes a control circuit to perform the detection, and a communication interface to send control signaling to effectuate the transfer. The data flow transfer to the ad-hoc connection implements direct communication between the mobile nodes, and advantageously decreases the load of the cellular communication network.

In at least one embodiment, a base station for use in a cellular communication network is configured to operate as the network node. In another embodiment, a radio network controller for use in a cellular communication network is configured to operate as the network node. In yet another embodiment, a base station and corresponding radio network controller for use in a cellular communication network are configured to collectively operate as the network node.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 4a-b are each block diagrams of one embodiment of a single base station that supports transfer of a data flow from a cellular to an ad-hoc connection.

DETAILED DESCRIPTION

Figure 1:
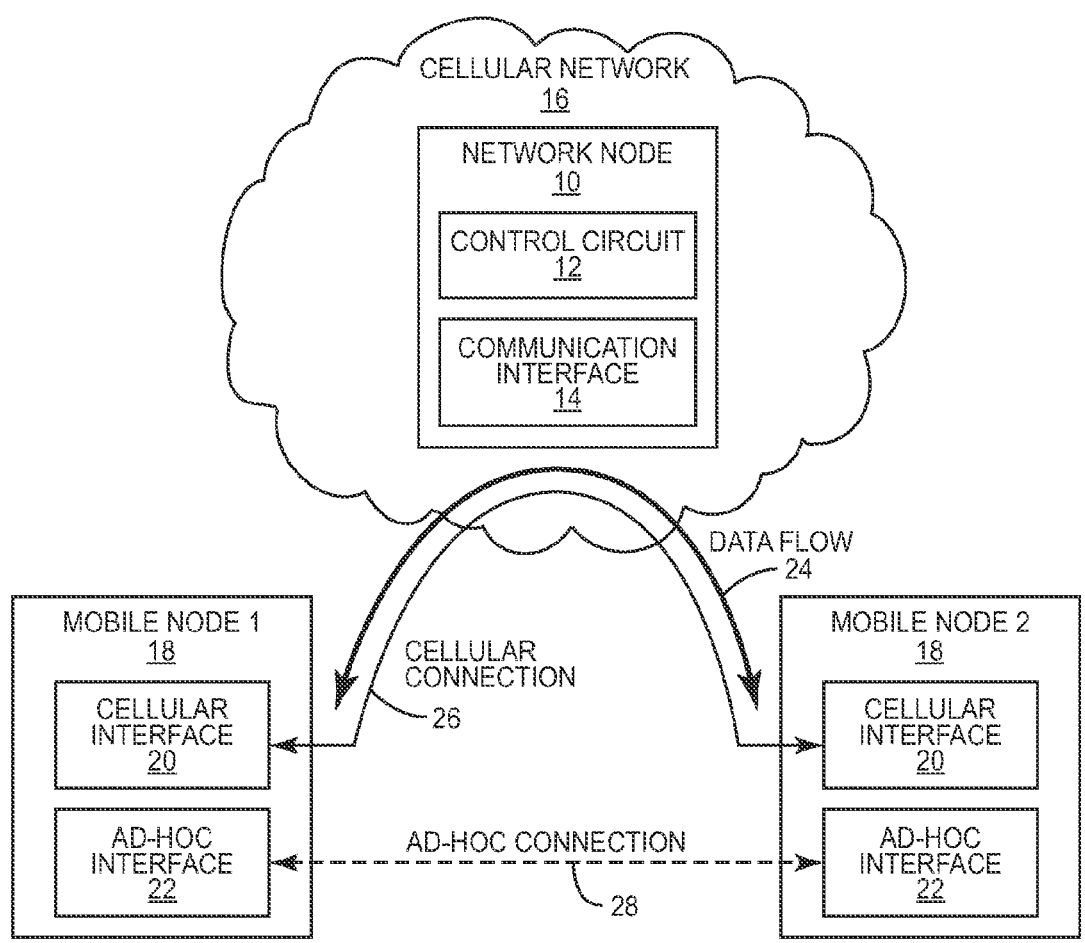
FIG. 1 is a block diagram of one embodiment of a cellular network and two mobile nodes, capable of supporting a cellular connection and a non-cellular, ad-hoc connection.

FIG. 1 is a block diagram of one embodiment of a cellular network 16 and two mobile nodes 18, capable of supporting a cellular connection 26 and a non-cellular, ad-hoc connection 28. Both connections 26, 28 are wireless connections. Each of the mobile nodes 18 includes at least a first, cellular communication interface 20 for said cellular connection 26, and a second, ad-hoc communication interface 22 for said ad-hoc connection 28. The supporting cellular network 16 includes a network node 10 having a control circuit 12 and one or more communication interfaces 14. As will be described below, the network node 10 is operable to transfer a data flow 24 from the cellular connection 26 to the ad-hoc connection 28, and optionally back to the cellular connection 26. Some example ad-hoc connections 28 include WLAN and FlashLinQ connections. Of course, these are only examples, and it is understood that other ad-hoc connections 28 could be used. In one example, the network node 10 corresponds to a base station 32, a radio network controller 34, or both (see FIG. 7).

The control circuit 12 may be implemented in dedicated or otherwise fixed circuitry, or may be implemented in programmable digital processing circuitry, or in some combination of the two. For example, in at least one embodiment, the control circuit 12 comprises one or more computer-based circuits, such as one or more microprocessor-based circuits that are configured to operate as the control circuit 12 based on the execution of computer program instructions stored in a memory or other computer-readable medium in or accessible to the network node 10. Other types of digital processing circuitry, such as FPGAs or ASICs, are also contemplated for use in implementing the control circuit 12.

Further, in one or more embodiments, the communication interface 14 comprises one or more interface circuits, which may comprise a combination of physical interface circuits and logical control circuits, for implementing particular communication protocols. Additionally, it will be understood that the communication interface 14 may comprise plural interfaces, for communicating according to different protocols, or for communicating with different entities, e.g., one interface for backhaul communications with a Radio Network Controller (RNC) 34 (see FIG. 7) or other node within the Radio Access Network (RAN) part of a cellular communication network and/or for communicating with entities in a Core Network (CN) part of the network. Still further, in at least one embodiment, the network node 10 is implemented as a cellular network base station and, in at least one such embodiment, the communication interface 14 includes the cellular communication interface (radio transceivers and associated control circuitry) for wirelessly communicating with mobile nodes 18.

In one example, each of the cellular interface 20 and the ad-hoc interface 22 provides a plurality of IPv6 addresses, each capable of supporting a separate data flow 24. In one example, the one or more data flows 24 are Multipath Transmission Control Protocol (MPTCP) data flows, which can be transferred between different TCP paths (and between the connections 26, 28) without terminating the data flows.

Figure 2:
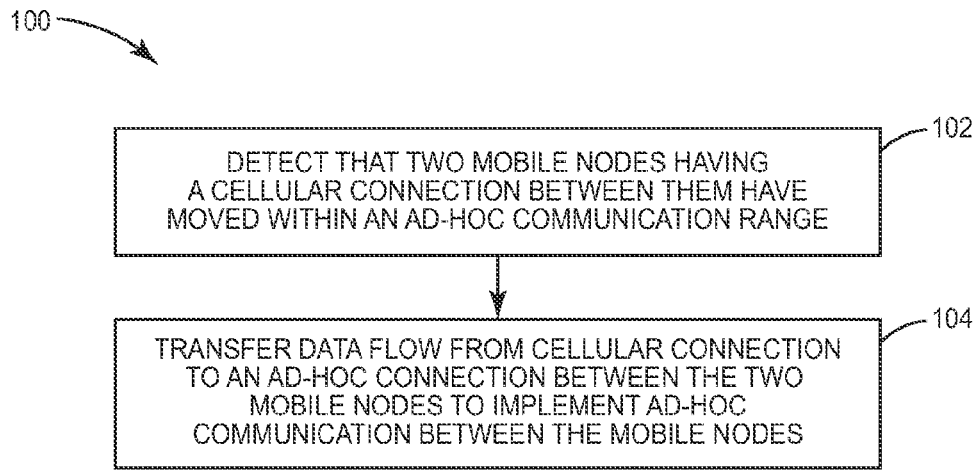
FIG. 2 is a logic flow diagram of one embodiment of a method of transferring a data flow between two mobile nodes from a cellular connection to a non-cellular, ad-hoc connection.

FIG. 2 is a logic flow diagram of one embodiment of a method 100 of transferring the data flow 24 between the two mobile nodes 18 from a cellular connection 26 supported by a cellular communication network 16 to a non-cellular, ad-hoc connection 28 between said mobile nodes 18. The method 100 is implemented in a network node 10 configured for operation in the cellular communication network 16. The network node 10 detects that the two mobile nodes 18 have moved within an ad-hoc communication range (step 102). The network node 10 then transfers the data flow 24 from the cellular connection 26 to the ad-hoc connection 28 responsive to the detection of step 102 (step 104). By performing step 104, the network node 10 implements direct communication between the mobile nodes 18, and thereby decrease the load of the cellular communication network 16. In one embodiment the control circuit 12 performs the detection of step 102 and the transfer of step 104. In this embodiment, performance of step 104 includes the control circuit 12 sending control signaling to the mobile nodes 18 via communication interface 14.

The cellular connection 26 supports a foreground data flow 24 that is apparent to users of the mobile nodes 18 (e.g. a voice call), and a background data flow 30 that may be hidden from users of the mobile nodes 18 (see, e.g., FIGS. 2*a-b*). Although FIG. 1 illustrates the ad-hoc connection 28 as being present without a data flow 24, it is understood that the network node 10 may only initiate establishment of the ad-hoc connection 28 responsive to deciding to transfer the data flow 24 to the ad-hoc connection 28.

Figure 3:
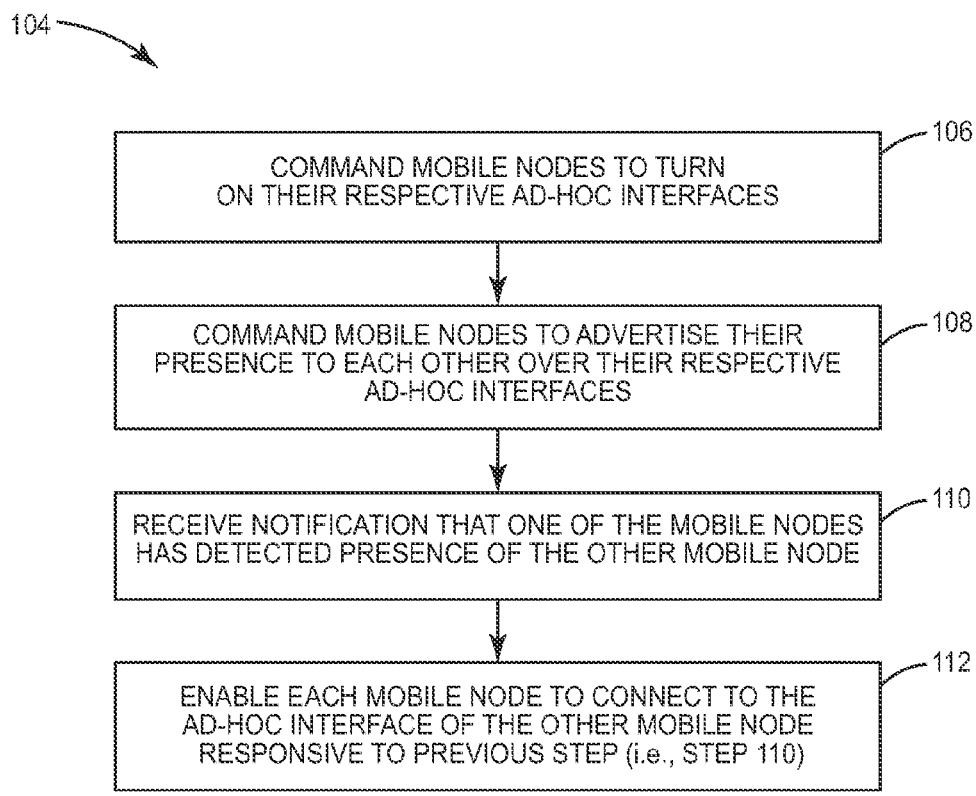
FIG. 3 is a logic flow diagram that provides, according to one embodiment, an exemplary elaboration of a portion of the method of FIG. 2.

FIG. 3 is a logic flow diagram that provides, according to one embodiment, an elaboration of step 104 of the method 100. Upon detecting that the mobile nodes have a cellular connection 26 and are within an ad-hoc communication range of each other (step 102), the network node 10 commands each mobile node 18 to turn ON its respective ad-hoc interface 22 (step 106). In one embodiment, each ad-hoc interface 22 has a default OFF state to conserve battery power of the mobile nodes 18. In one embodiment, each mobile node 18 reports its battery level to the network node 10, and the network node 10 conditions the performance of step 104 (and corresponding steps 106-112) on each mobile node 18 reporting a battery level above a defined minimum battery threshold. In the same or another embodiment, the network node 10 conditions performance of step 104 on a determination that the data flow 24 is eligible for transfer. A data flow 24 may be ineligible for transfer if the data flow 24 would be unacceptably impaired by transfer to the ad-hoc connection 28.

Despite being within the ad-hoc communication range of each other, each mobile node 18 may be unaware of the presence of the other mobile node 18. The network node 10 commands each mobile node 18 to periodically transmit an encrypted advertisement of its presence via its respective ad-hoc interface 22 to the other of the mobile nodes 22 (step 108). Thus, the network node 10 acts as a "home proxy agent" by separately providing each mobile node 18 with the necessary information about the other mobile node 18 to enable them to advertise their presence to only each other.

Step 108 may include the network node 10 sending a random parameter to each mobile node 18 (PRES_RAND), sending an anonymity encryption key (ANYKEY) to each mobile node 18, and commanding each mobile node 18 to encrypt their respective random parameter (PRES_RAND) with the ANYKEY. Although a single ANYKEY could be used for both mobile nodes 18, it is understood that each mobile node 18 may receive a unique ANYKEY and a unique random parameter. Thus, for example, the network node 10 may transmit a first random parameter (PRES_RAND1) and anonymity key (ANYKEY1) to a first of the mobile nodes 18, and may transmit a second random parameter (PRES_RAND2) and anonymity key (ANYKEY2) to the other of the two mobile nodes 18. In one embodiment the control circuit 12 is configured to carry out the transmission of the encryption key via the communication interface 14, and is configured to command of each of the mobile nodes 18 to use the encryption key to encrypt the advertisement.

Upon detecting the encrypted advertisement message of another mobile node 18, the receiving mobile node 18 transmits a notification message to the network node 10 (step 110). If the mobile nodes 18 provide their respective advertisement messages yet do not detect each other's presence, step 108 may be periodically repeated until either the mobile nodes 18 do detect each other's presence or until a termination condition occurs. Example termination conditions may include the mobile nodes 18 becoming unable to communicate via their respective ad-hoc interfaces 22 or a signal quality between the mobile nodes 18 over their respective ad-hoc interfaces 22 becoming less than a predefined signal strength threshold. Additional example termination conditions may include the battery level of one of the mobile nodes 18 dropping below the defined minimum battery threshold, or a permitted time period having transpired.

By utilizing the termination conditions, the control circuit 12 minimizes the battery consumption of step 108. Additionally, the network node 10 further minimizes battery consumption on each mobile node 18 by having both mobile nodes 18 participating in the advertisement message transmission process of step 108, instead of making one mobile node 18 incur a greater burden by performing all the signaling and/or sensing of step 108.

The network node 10 enables each mobile node 18 to connect to the ad-hoc interface 22 of the other mobile node 18 (step 112) responsive to one of the mobile nodes 18 detecting the encrypted advertisement of the other of the mobile nodes 18. The network node 10 is aware of one of the mobile nodes 18 detecting the encrypted advertisement of the other of the mobile nodes 18 from receiving the notification of step 110. In one example, in step 112 the network node 10 transmits to each mobile node 18 a message impersonating the other of the mobile nodes 18, with the message including an IPv6 address of the ad-hoc interface 18 of the impersonated mobile node 18. The network node 10 then transfers the data flow 24 to the ad-hoc connection 28 between the mobile nodes 18.

The network node 10 maintains the background data flow 30 in the cellular connection 26 after transferring the foreground data flow 24 to the ad-hoc connection 28. In one example network node 10 is aware of transport layer session parameters between the two mobile nodes 18, and the background data flow 30 is used for transport layer signaling. In one embodiment the network node 10 transfers the data flow 24 from the ad-hoc interfaces 22 back to the cellular interfaces 20 in response to one of the plurality of termination conditions described above (e.g., the mobile nodes 18 becoming unable to communicate via their respective ad-hoc interfaces 22, or a signal quality between the mobile nodes 18 over their respective ad-hoc interfaces 22 becoming less than a predefined signal strength threshold). In one embodiment, the control circuit 12 is configured to carry out the step of maintaining the background data flow 30 in the cellular connection 26 after transfer of the foreground data flow 24 to the ad-hoc connection 28, and is further configured to carry out the step of selectively using the background data flow 30 to transfer the data flow 24 back to the cellular connection 26 from the ad-hoc connection 28.

FIGS. 4a-b are each block diagrams of one embodiment of a single base station 32 that supports transfer of data flow 24 between two mobile nodes 18 (MN1, MN2) from a cellular to an ad-hoc connection. That is, the illustrated base station 32 in FIGS. 4a-b operates as the previously described network node 10.

Prior to transfer to the ad-hoc connection 28, both the foreground data flow 24 and background data flow 30 are conducted via the cellular connection 26 (see FIG. 4a). After the transfer to the ad-hoc connection 28, the foreground data flow 24 is conducted via the ad-hoc connection 28 but the background data flow 30 is still conducted via the cellular connection 26 (see FIG. 4b).

Figure 5A:
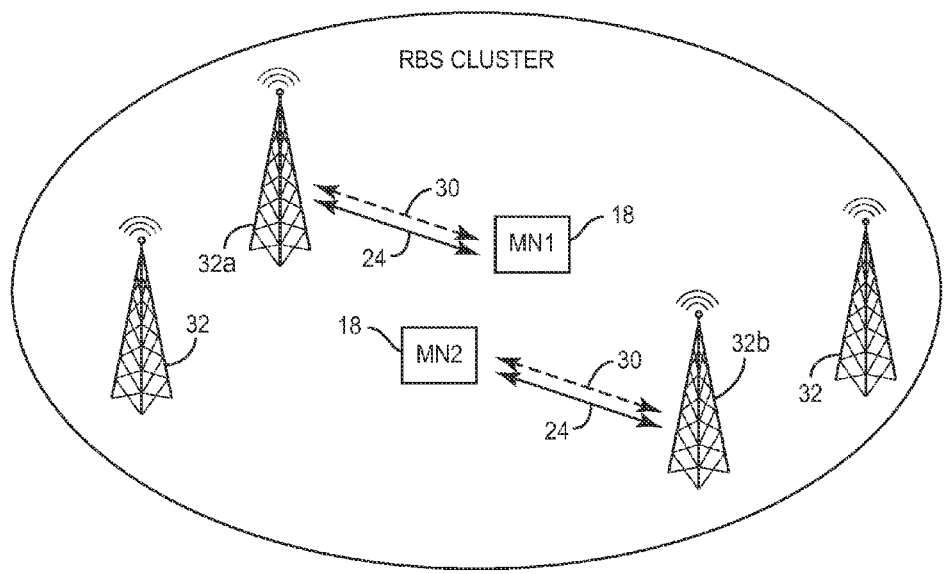
FIGS. 5a-b are each block diagrams of one embodiment of a cluster of base stations that supports transfer of a data flow from a cellular to an ad-hoc connection.
Figure 5B:
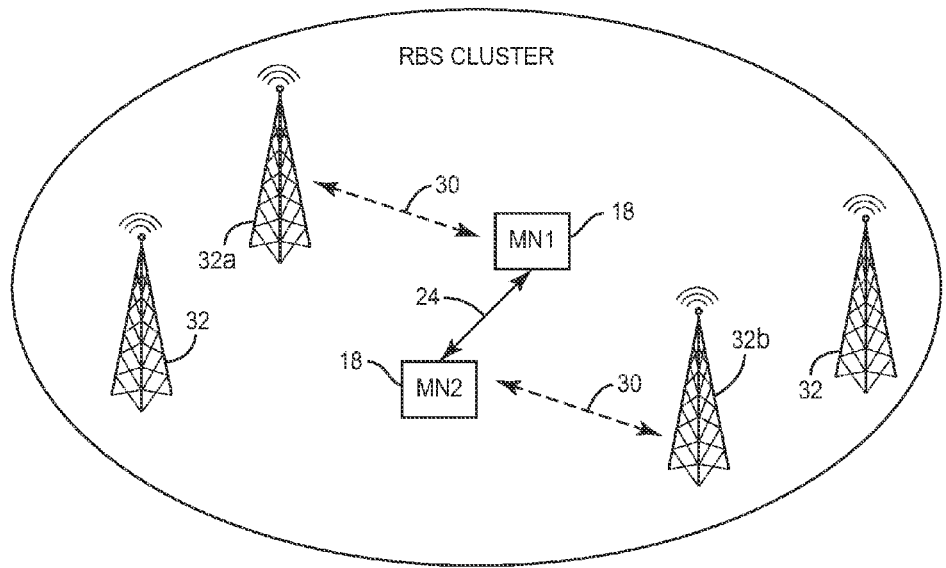

FIGS. 5a-b are each block diagrams of one embodiment of a cluster of base stations 32 that support transfer of data flow 24 between two mobile nodes 18 (MN1, MN2) from a cellular connection 26 conducted via two base stations 32a-b (see FIG. 5a) to an ad-hoc connection 28 conducted directly between the mobile nodes 18 (see FIG. 5b). As shown in FIGS. 5a-b, although two mobile nodes 18 may have a cellular connection conducted through separate base stations 32a-b, the mobile nodes 18 may still be within the ad-hoc communication range.

In the example of FIGS. 5a-b, the base stations 32a-b, each operating as a previously described network node 10, coordinate with each other to perform the transfer of the data flow 24 to the ad-hoc connection 28. Assuming that the base station 32a is triggering the data flow 24 transfer, the base station 32a will transmit a "Session_Handoff_Initiate" (SHI) message to the base station 32b.

The SHI message may include the following
cellular interface IPv6 address of MN1,
ad-hoc interface IPv6 address of MN1,
the ANYKEY used by MN1,
the random parameter of MN1,
the ANYKEY used by MN2,
the random parameter of MN2, and
an advance time period until the transfer will occur.

Based on receipt of SHI, the base station 32b transfers a "Session_Handoff_ACK" (SHA) message to the base station 32a that includes the same information as the SHI but with information for MN2 instead of MN1 (e.g. the IPv6 addresses of the interfaces 20, 22 of MN2).

Figure 6A:
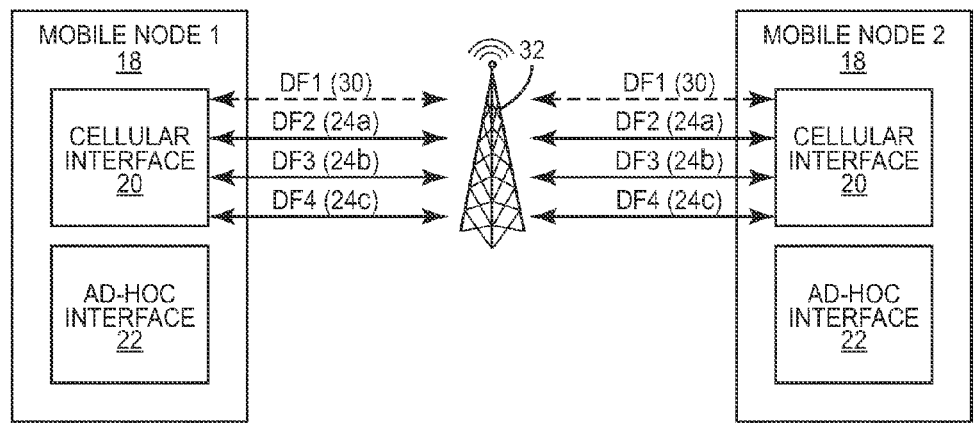
FIGS. 6a-b are each block diagrams of one embodiment of a single base station that supports transfer of a plurality of data flows from a cellular to an ad-hoc connection.
Figure 6B:
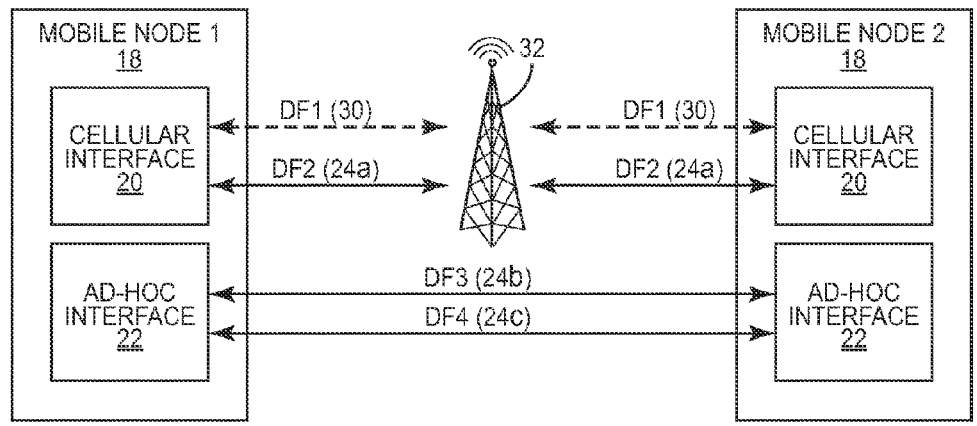

FIGS. 6a-b are each block diagrams of one embodiment of a single base station 32 that supports transfer of a plurality of data flows 24a-c from a cellular to an ad-hoc connection. In the embodiment of FIGS. 6a-b, the cellular connection 26 supports a plurality of data flows 24a-d, and step 104 of transferring the data flow 24 from the cellular connection 26 to the ad-hoc connection 28 is selectively repeated to transfer additional ones of the plurality of data flows 24a-d to the ad-hoc connection 18. Before transfer to the ad-hoc connection 28 (see FIG. 6a) the base station 32 supports background data flow 30 (DF1) and foreground data flows 24a, 24b and 24c (DF2, DF3, DF4) via a cellular connection 26 of each cellular interface 20. After transfer to the ad-hoc connection 28 (see FIG. 6b) data flows 30 and 24a are maintained on the cellular connection 26, but data flows 24b and 24c are transferred to the ad-hoc connection 28. Step 102 may be performed once for all data flows DF1-4, but the network node 10 may perform step 104 multiple times, with a first performance for DF3, and a second performance for DF4. The multiple performances of step 104 may be either sequential or simultaneous.

One example application corresponding to FIGS. 6a-b could be where two mobile nodes 18 that had a cellular connection 26 (and therefore had a background dataflow DF1) were conducting a video conference (data flow DF2 for video, data flow DF3 for voice) and also were playing a video game (data flow DF4 for game). The network node 10 may decide that the voice and game data flows DF2, DF3 are eligible for transfer to the ad-hoc connection 28, but that the video game data flow DF4 is not eligible, perhaps due to the large amount of data being transmitted between the mobile devices 18 for the data flow DF4. Thus, as shown in FIG. 6b, the network node 10 may choose to transfer only a portion of the data flows 24a-b to the ad-hoc connection 28. Additionally, although FIGS. 1 and 6a-b only illustrate ad-hoc connections between two mobile nodes 18, it is understood that a single mobile node 18 may be configured to simultaneously conduct separate ad-hoc connections 28 supporting corresponding data flows 24 with a plurality of mobile nodes 18.

As discussed above, in some instances a user of a mobile node 10 may wish to share information relevant to a particular location that may be of interest to the users of other mobile nodes 10 located within a certain range of the user. For example, two travelers at an airport who are unaware of each other may wish to share the cost of a taxi ride to a hotel. Each user may command their respective mobile node 18 to notify the network node 10 (which may be wholly or at least partly implemented in the base station 32) that they are interested in carpooling. The base station 32 in such embodiments, being aware of this mutual interest, initiates a data flow 24 between the mobile nodes over cellular connection 26, with the data flow corresponding to a text chat. Once the data flow 24 for the chat is established, the base station 32 selectively transfers the data flow from the cellular connection 26 to an ad-hoc connection 28, based on detecting that the two mobile nodes 18 are within ad-hoc communication range, enabling the users to converse in a text chat over the ad-hoc connection 28.

Figure 7:
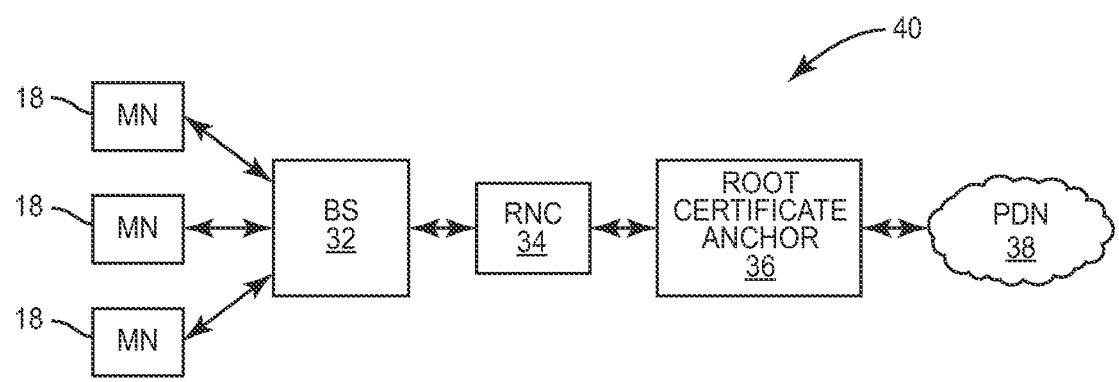
FIG. 7 is a block diagram of one embodiment of a wireless communication network.

FIG. 7 is a block diagram of one embodiment of a wireless communication network 40 including the mobile nodes 18 and base station 32 of FIGS. 4-6. In the example of FIG. 7, the base station 32 is controllable by a radio network controller 34 that obtains authentication certificates from a root certificate anchor 36. The base station 32 and radio network controller 34 collectively support communication between the mobile nodes 18 and a public data network 38, such as the Internet. In one example, the network node 10 includes the base station 32, the radio network controller 34, or both.

The root certificate anchor 36 may include, for example, a Public Data Network Gateway (PDN GW) or a Serving General Packet Radio Service Support Node Gateway (SGSN GW). In addition to the providing an ANYKEY to each mobile node 18 for encryption in step 108, the root certificate anchor 36 is in one embodiment also operable to provide an additional certificate to each mobile node 18, and to the base station 32 and radio network controller 34. The additional certificates may be used for secure communication between the mobile node 18 and another node in the cellular network 16, such as the base station 32 or the radio network controller 34. In one example, the root certificate anchor 36 also provides an additional certificate for each data flow 24 so that the same certificate does not have be used for multiple data flows 24.

From a security standpoint, the network node 10 relies on the inherent security of the cellular network 16 in establishing the ad-hoc connection 28. In one embodiment the cellular network 16 is a 3GPP Long Term Evolution (LTE) network and the cellular connection 26 is an LTE connection. In this LTE embodiment, the high level of security inherent in an LTE network is present when the network node 10 is transferring one or more data flows 24 to the ad-hoc connection 28. Because the mobile nodes 18 are each authenticated with respect to at least one of the base station 32 and the radio network controller 34, the mobile nodes 18 are implicitly authenticated towards each other, and therefore do not need to exchange any certificates between each other over the ad-hoc connection 28. Of course, an LTE network is only one example, and it is understood that other types of cellular networks 16 could be used, and that the mobile nodes 18 could rely on the inherent security of those other cellular networks. In one embodiment the cellular network 16 is a 3G network and the cellular connection 26 is a 3G connection.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of transferring a data flow between two mobile nodes from a cellular connection supported by a cellular communication network to a non-cellular, ad-hoc connection between said mobile nodes, said method being implemented in a network node configured for operation in said cellular communication network and comprising:
   detecting that the two mobile nodes have moved within an ad-hoc communication range; and
   transferring the data flow from the cellular connection to the ad-hoc connection responsive to said detection, to implement direct communication between the mobile nodes and thereby decrease the load of said cellular communication network, wherein the data flow is a multipath transmission control protocol (MPTCP) data flow and wherein said data flow is a foreground data flow, said cellular connection further comprising a background data flow, said method further comprising:
   maintaining said background data flow in said cellular connection after transferring said foreground data flow to said ad-hoc connection.

2. The method of claim 1, comprising:
   selectively using said background data flow to transfer said foreground data flow back to said cellular connection.

3. A network node configured for operation in a cellular communication network, comprising:
   a control circuit configured to detect that two mobile nodes have moved into ad-hoc connection range of each other and, in response thereto, to selectively transfer a data flow from a cellular connection between said two mobile nodes to a non-cellular, ad-hoc connection between them, wherein the data flow is a multipath transmission control protocol (MPTCP) data flow; and
   one or more communication interfaces configured to send control signaling to effectuate said transfer, wherein said data flow is a foreground data flow, said cellular connection further comprising a background data flow, and wherein said control circuit is configured to maintain said background data flow in said cellular connection after the selective transfer of said foreground data flow to said ad-hoc connection.

4. The network node of claim 3, wherein said control circuit is configured to selectively use said background data flow to transfer said foreground data flow back to said cellular connection.

* * * * *

UNITED STATES PATENT AND TRADEMARK OFFICE
CERTIFICATE OF CORRECTION

PATENT NO. : 8,547,938 B2
APPLICATION NO. : 13/081329
DATED : October 1, 2013
INVENTOR(S) : Haddad It is certified that error appears in the above-identified patent and that said Letters Patent is hereby corrected as shown below:

In the Specification

In Column 4, Line 6, delete "mobile nodes 22" and insert -- mobile nodes 18 --, therefor.

In Column 4, Line 63, delete "ad-hoc interface 18" and insert -- ad-hoc interface 22 --, therefor.

In Column 6, Line 4, delete "ad-hoc connection 18." and insert -- ad-hoc connection 28. --, therefor.

In Column 6, Lines 35-36, delete "mobile node 10" and insert -- mobile node 18 --, therefor.

In Column 6, Lines 37-38, delete "mobile nodes 10" and insert -- mobile nodes 18 --, therefor.

Signed and Sealed this
Fourth Day of February, 2014

Michelle K. Lee
*Deputy Director of the United States Patent and Trademark Office*